(12) United States Patent
Stewart (10) Patent No.: US 8,212,159 B2
(45) Date of Patent: Jul. 3, 2012

(54) CAPACITIVE TOUCHPAD METHOD USING MCU GPIO AND SIGNAL PROCESSING

(75) Inventor: Bradley C. Stewart, Eugene, OR (US)

(73) Assignee: Freescale Semiconductor, Inc., Austin, TX (US)

( * ) Notice: Subject to any disclaimer, the term of this patent is extended or adjusted under 35 U.S.C. 154(b) by 589 days.

(21) Appl. No.: 12/463,966

(22) Filed: May 11, 2009

(65) Prior Publication Data

US 2010/0282525 A1 Nov. 11, 2010

(51) Int. Cl.
*G06F 3/044* (2006.01)
(52) U.S. Cl. .................... 178/18.06; 345/173
(58) Field of Classification Search .......... 345/173–183; 178/18.01–20.04; 340/5.53, 5.83
See application file for complete search history.

(56) References Cited

U.S. PATENT DOCUMENTS

| | | | |
|---|---|---|---|
| 4,639,720 A | 1/1987 | Rympalski et al. | 345/174 |
| 4,736,191 A * | 4/1988 | Matzke et al. | 341/20 |
| 5,051,545 A * | 9/1991 | McDermott | 178/18.07 |
| 5,648,642 A * | 7/1997 | Miller et al. | 178/18.06 |
| 5,777,596 A | 7/1998 | Herbert | 345/104 |
| 5,825,352 A * | 10/1998 | Bisset et al. | 345/173 |
| 6,057,830 A | 5/2000 | Chan et al. | 345/157 |
| 6,222,528 B1 * | 4/2001 | Gerpheide et al. | 345/173 |
| 6,392,636 B1 | 5/2002 | Ferrari et al. | 345/173 |
| 6,432,514 B1 | 8/2002 | Kobayashi et al. | 428/32.16 |
| 6,940,291 B1 * | 9/2005 | Ozick | 324/658 |
| 7,046,230 B2 | 5/2006 | Zadesky et al. | 345/176 |
| 7,982,723 B2 * | 7/2011 | Ningrat | 345/174 |
| 2006/0279548 A1 * | 12/2006 | Geaghan | 345/173 |
| 2008/0179112 A1 * | 7/2008 | Qin et al. | 178/18.06 |
| 2009/0114457 A1 * | 5/2009 | Lii | 178/18.06 |
| 2009/0174675 A1 * | 7/2009 | Gillespie et al. | 345/173 |
| 2009/0174688 A1 * | 7/2009 | Westerman | 345/178 |
| 2009/0256817 A1 * | 10/2009 | Perlin et al. | 345/174 |
| 2010/0066701 A1 * | 3/2010 | Ningrat | 345/174 |
| 2010/0079384 A1 | 4/2010 | Grivna | 345/173 |
| 2010/0097329 A1 * | 4/2010 | Simmons et al. | 345/173 |
| 2010/0245286 A1 * | 9/2010 | Parker | 345/174 |

* cited by examiner

*Primary Examiner* — Alexander S Beck
*Assistant Examiner* — Sanjiv D Patel
(74) *Attorney, Agent, or Firm* — VanLeeuwen & VanLeeuwen; David Dolezal (57) ABSTRACT

A microcontroller identifies a maximum x-axis charge time and a maximum y-axis charge time, along with x-axis sensor locations and y-axis that correspond to the maximum charge times (maximum charge time sensor locations). Next, the microcontroller identifies sensor locations that are adjacent to the maximum charge time sensor locations and computes adjacent charge time ratios based upon their corresponding charge times. In turn, the microcontroller uses the largest adjacent charge time ratios and the maximum charge time sensor locations to compute and map an x-axis position and a y-axis position of a user's contact location on a two-dimensional grid.

17 Claims, 12 Drawing Sheets

```
usb_cfg_init();

cdc_init();

// main loop. read electrodes and send them out when a 'v' is received
 for(;;)
 {
    read_electrode();                    ── 1210 cdc_process();  //send and receive data in Tx and Rx buffers c = cdc_getch(); //read character from receive buffer
    if(c =='v')  ── 1220
    {
      if(fault)
      {
        fault=0;                         ── 1230
        TPM1SC = 0x0c; //reset TOF
      }
      for(k=0;k<NUM_ELECTRODES;k++)      ── 1240
      {
        if(touch_values[k]>255)touch_values[k]=255;
        r=cdc_putch( (char)touch_values[k]);
      }
      r=cdc_putch(Cr);
      r=cdc_putch(Lf);
    }
 }
```

*FIG. 12*

CAPACITIVE TOUCHPAD METHOD USING MCU GPIO AND SIGNAL PROCESSING

BACKGROUND OF THE INVENTION

1. Technical Field

The present invention relates to a method of detecting a touchpad contact location using microcontroller general purpose input/outputs (GPIOs) connected to sensors that vary in capacitance based upon whether a user touches the sensors.

2. Description of the Related Art

Electronic devices are incorporating touch-sensitive interfaces in order to improve a user's experience. These touch-sensitive interfaces typically consist of a specialized surface that translates the motion and position of a user's fingers to a relative position on a screen. These touch-sensitive interfaces, however, can be costly based upon their implementation because they often require specialized circuits.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Certain specific details are set forth in the following description and figures to provide a thorough understanding of various embodiments of the invention. Certain well-known details often associated with computing and software technology are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention. Instead, the following is intended to provide a detailed description of an example of the invention and should not be taken to be limiting of the invention itself. Rather, any number of variations may fall within the scope of the invention, which is defined by the claims, and equivalents thereof, that follow the description.

Figure 1:
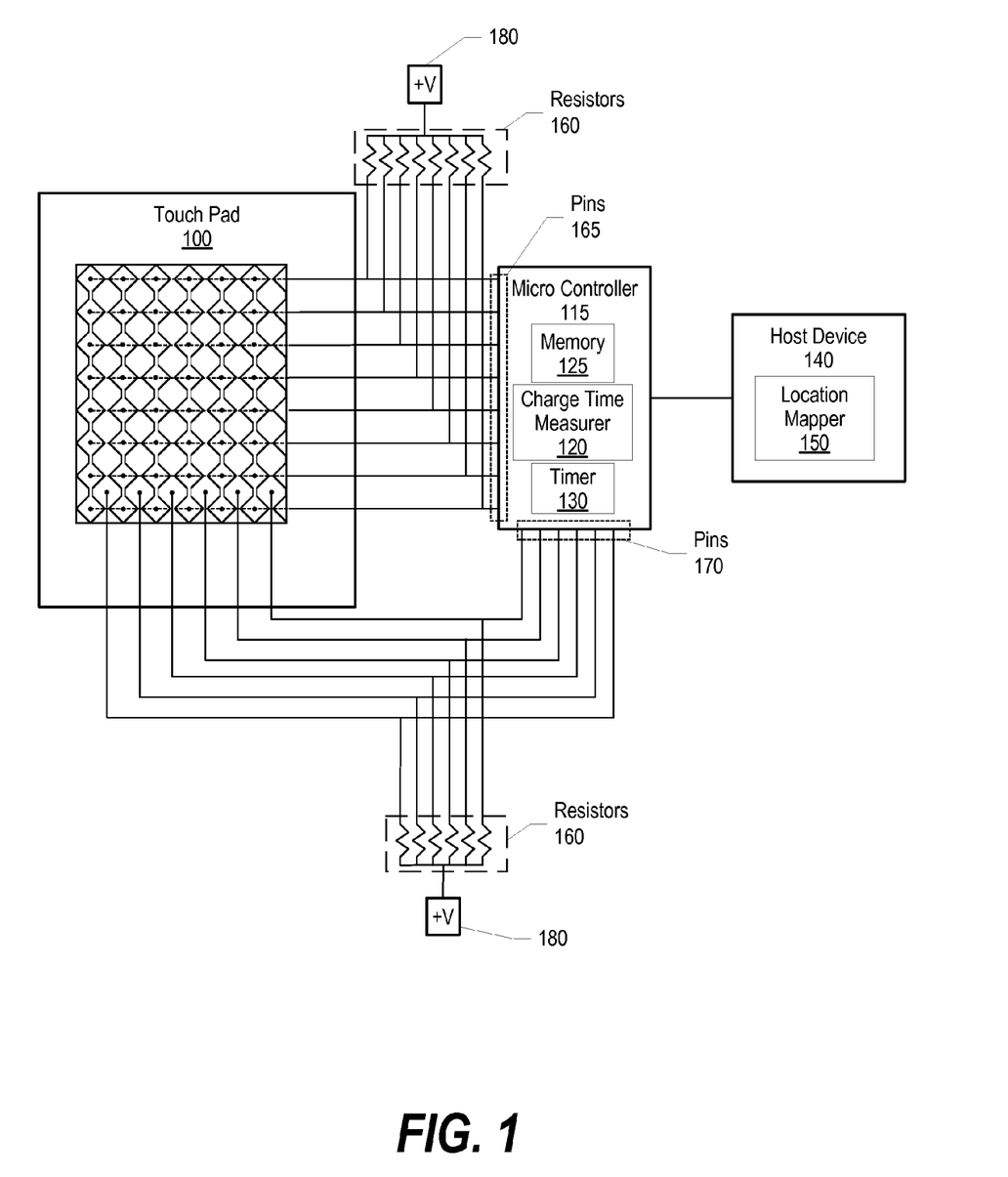
FIG. 1 is a diagram showing a system that includes a touchpad and a microcontroller that identifies sensor locations at which a user contacts the touchpad by detecting changes in voltage charge times.

FIG. 1 is a diagram showing a system that includes a touchpad and a microcontroller that identifies sensor locations at which a user contacts the touchpad by detecting changes in voltage charge times. The embodiment shown in FIG. 1 shows that touch pad 100 includes an 8×6 matrix of diamond shaped x-axis sensors and y-axis sensors. As one skilled in the art can appreciate, other patterns and sizes may be utilized.

In one embodiment, touchpad 100 includes electrodes that are constructed of copper material on a printed circuit board. In this embodiment, touch pad 100 may be covered by a thin insulating material, such as vellum or thin material with a low dielectric constant, such as Lexan, ABS plastic, or Plexiglas. In turn, each electrode forms a sensor that, when a voltage is applied, inherently creates a projected electric field which forms a capacitor between the sensor and a conductor.

The embodiment shown in FIG. 1 shows that each sensor connects to voltage 180 through pull-up resistors 160 (e.g., one mega ohm resistors).

Each sensor also connects to one of microcontroller 115's (e.g., a processing unit) single GPIO (general purpose input-output) pins 165 and 170. The voltage rise time on each of the GPIO pins (when set up as a high impedance input) depends upon the formula:

$$\text{time constant } (t) = \text{resistor value } (R) \times \text{capacitor value } (C).$$

In this formula, "R" is the value of the pull-up resistor and "C" is the capacitance at each sensor, which is typically very small. Since R remains unchanged, the time constant depends upon a sensor's capacitance. When untouched by a user, each sensor has an associated slight "stray" capacitance. However, when a user touches one of the sensors, the user's inherent body capacitance adds to the stray capacitance, thus increasing the value of "C." In turn, the time constant is larger and, therefore the voltage rise time is longer (see FIG. 4 and corresponding text for further details). As one skilled in the art can appreciate, pull-down resistors may be used instead of pull-up resistors and, in this embodiment, microcontroller 115 performs different steps to detect and measure a voltage discharge time. Microcontroller 115 includes memory 125, which includes code that instructs microcontroller 115 to perform actions described herein.

In order to detect a user's contact location, microcontroller 115 grounds each of pins 165 and 170, thus discharging the capacitance voltage and resetting each pin. Once reset, charge time measurer 120 uses timer 130 to measure the amount of time that each pin takes to reach a high input threshold level (see FIGS. 2-4, 6, and corresponding text for further details). Each sensor connects to microcontroller 115 through one pin in order for microcontroller 115 to identify a user's two-dimensional contact location (x-axis location and y-axis location). Pins 165 measure sensor charge times relative to an "X-axis" contact location (x-axis charge times) and pins 170 measure sensor charge times relative to a "Y-axis" contact location (y-axis charge times). For example, if a user touches a display screen, an x-axis sensor produces a longer charge time relative to other x-axis sensors and a y-axis sensor produces a longer charge time relative to other y-axis sensors (see FIG. 5 and corresponding text for further details). Microcontroller 115 collects the x-axis and y-axis charge times and passes them to host device 140 (or higher software layer that runs in Microcontroller 115) for further processing by location mapper 150. Microcontroller 115 collects charge times a rate many times faster than a user contacts touchpad 100, such as every ten milliseconds. In one embodiment, microcontroller 115 includes location mapper 150 as higher level code.

Location mapper 150 analyzes the x-axis charge times and y-axis charge times in order to identify the largest x-axis and y-axis charge times. These charge times correspond to a primary location at which the user contacts touchpad 100. Location mapper 150 also analyzes adjacent sensor locations in order to "fine tune" the location at which the user contacted touch pad 100 (see FIG. 7 and corresponding text for further details). In turn, by computing an x-axis position and y-axis position, location mapper 150 is able to determine a two-dimensional contact location at which the user touched touchpad 100.

In one embodiment, microcontroller 115 collects charge times for a single dimension (e.g., x-axis) and location mapper 150 maps the charge times to a single dimension contact location, such as a volume control application or a contrast adjustment application.

Figure 2:
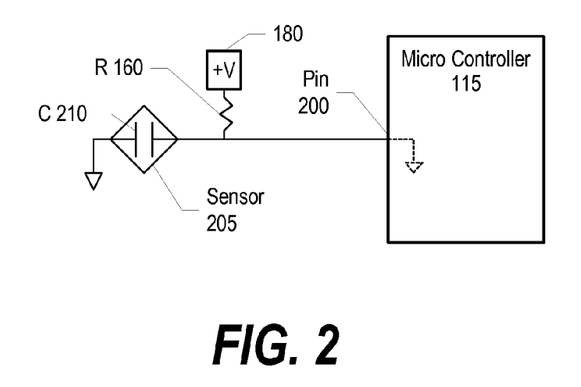
FIG. 2 is a diagram showing a resistor-capacitor network when a microcontroller configures a GPIO pin as an output and sets the pin to low.

FIG. 2 is a diagram showing a resistor-capacitor network when a microcontroller configures a GPIO pin as an output and sets the pin to low. Microcontroller 115 includes pin 200, which couples to sensor 205. FIG. 2 shows capacitor 210, which represents capacitive properties of sensor 205. A voltage level resides on pin 200 based upon a formula:

time constant ($t$)=resistor value ($R$)×capacitor value ($C$).

The time constant "t" is the amount of time that an R/C network takes to charge to a particular value. When the time constant is small, the R/C network exhibits a fast charge time, thus quickly charging to a voltage level. When the time constant is large, the R/C network exhibits a slower charge time, thus taking longer to charge to the same voltage level (see FIG. 4 and corresponding text for further details).

When microcontroller 115 sets pin 200 to low, microcontroller 200, in effect, grounds pin 200. In turn, any capacitive charge built up on sensor 205 discharges through pin 200 and pin 200's voltage becomes zero. When microcontroller 115 resets pin 200 to a high impedance input, pin 200 then becomes high impedance to sensor 205 and pin 200's voltage level starts to increase based upon the R/C time constant (see FIG. 3 and corresponding text for further details).

Figure 3:
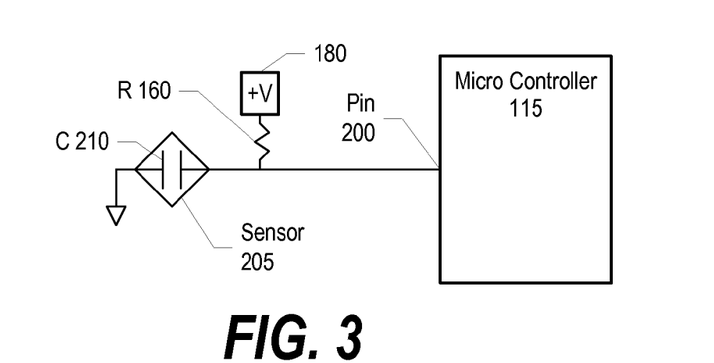
FIG. 3 shows a microcontroller configuring a GPIO pin as an input after discharging the GPIO pin.

FIG. 3 shows a microcontroller configuring a GPIO pin as an input after discharging the GPIO pin. As discussed above, pin 200's voltage level is based upon the formula $t=R\times C$. Since R 160's value stays constant (e.g., one mega ohm), the time constant of the R 160/C 210 network shown in FIG. 3 depends upon the value of C 210. When sensor 205 is untouched, C 210's capacitance is very small (stray capacitance). As such, the time constant is small and pin 200's voltage rises quickly to a "high" input threshold level (e.g., one-half of +V 180). In contrast, when a user touches sensor 205, the user's inherent capacitance adds to C 210, thus increasing C 210's overall capacitance value. As such, the R/C time constant is larger and sensor 205 charges to the input threshold level at a slower rate. As a result, microcontroller 115 is able to distinguish when a user touches a particular sensor based upon the amount of time that the sensor's corresponding pin reaches a "high" input voltage threshold.

Figure 4:
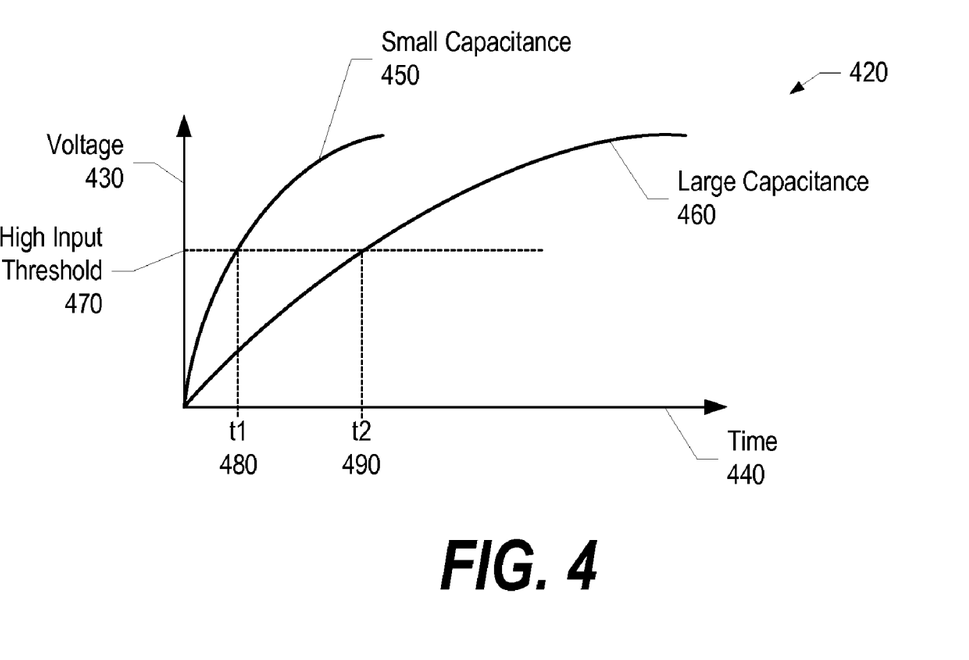
FIG. 4 is a diagram that graphs a microcontroller pin's voltage level based upon whether a user touches a corresponding sensor.

FIG. 4 is a diagram that graphs a microcontroller pin's voltage level based upon whether a user touches a corresponding sensor. Graph 420 plots time along horizontal axis 440 versus voltage along vertical axis 430. Small capacitance plot 450 corresponds to an R/C network that has a small time constant, such as when a sensor is untouched by a user. As can be seen, small capacitance graph 450 reaches high input threshold 470 at time t1 480. High input threshold 470 represents a voltage at which microcontroller 115 recognizes the input as a "1" or "high" (e.g., one-half of +V 180).

In contrast, large capacitance plot 460 corresponds to an RC network that has a larger time constant, such as when a user touches the sensor. As can be seen, large capacitance graph 460 reaches high input threshold 470 at time t2 490, which is longer than small capacitance plot 450 took to reach high input threshold 470. In turn, by analyzing the amount of time that an input pin takes to reach a high input threshold level, a microcontroller is able to determine whether a user is touching the input pin's corresponding sensor.

Figure 5:
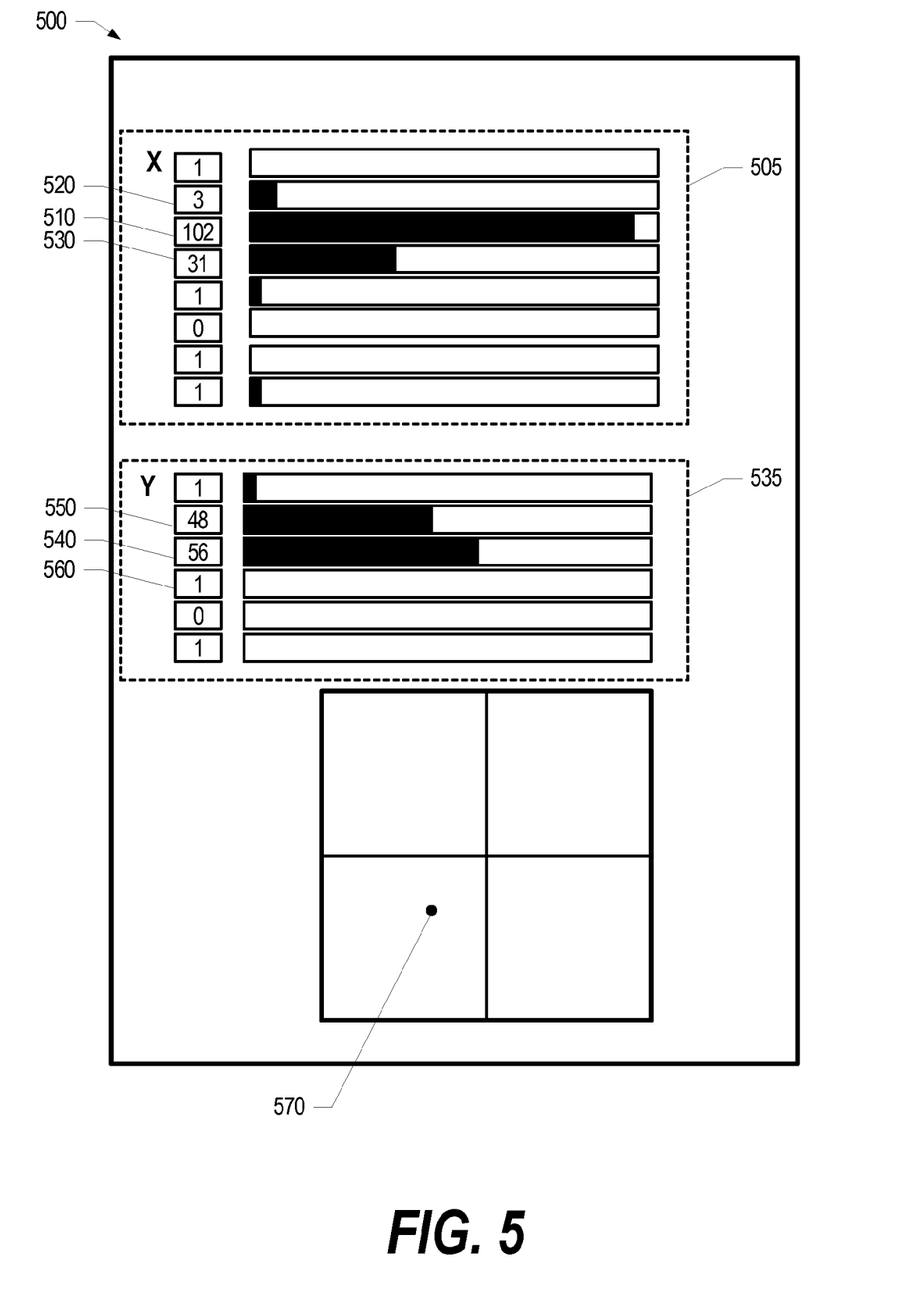
FIG. 5 is a user interface window showing x-axis and y-axis charge times converted to an x position and y position, which are plotted on a two-dimensional graph as a contact location.

FIG. 5 is a user interface window showing x-axis and y-axis charge times converted to an x position and y position, which are plotted on a two-dimensional graph as a contact location. User interface 500 includes area 505 that shows x-axis charge times and area 535 that shows y-axis charge times for various x-axis and y-axis sensor locations. As can be seen, x-axis sensor location 510 has the largest x-axis charge time (maximum x-axis charge time) and y-axis sensor location 540 has the largest y-axis charge time (maximum y-axis charge time), which correspond to a contact location that a user touches a touch pad.

In order to fine tune the user's contact location, a location mapper analyzes adjacent x-axis sensor locations 520 and 530 to determine whether the user's contact location resides somewhere in between x-axis sensor location 510 and one of adjacent x-axis sensor locations 520 or 530. The location mapper computes two different adjacent charge time ratios using the adjacent charge times. In turn, the location mapper determines which ratio is larger and applies a fine tuning factor to the x-axis sensor location, resulting in an x-axis position (see FIG. 7 and corresponding text for further details).

Likewise, the location mapper analyzes adjacent y-axis sensor locations 550 and 560 to determine whether the user's contact location resides somewhere in between y-axis sensor location 540 and one of adjacent y-axis sensor locations 550 or 560. In turn, once the location mapper computes the y-axis position, the location mapper displays contact location 570 on a two-dimensional graph.

Figure 6:
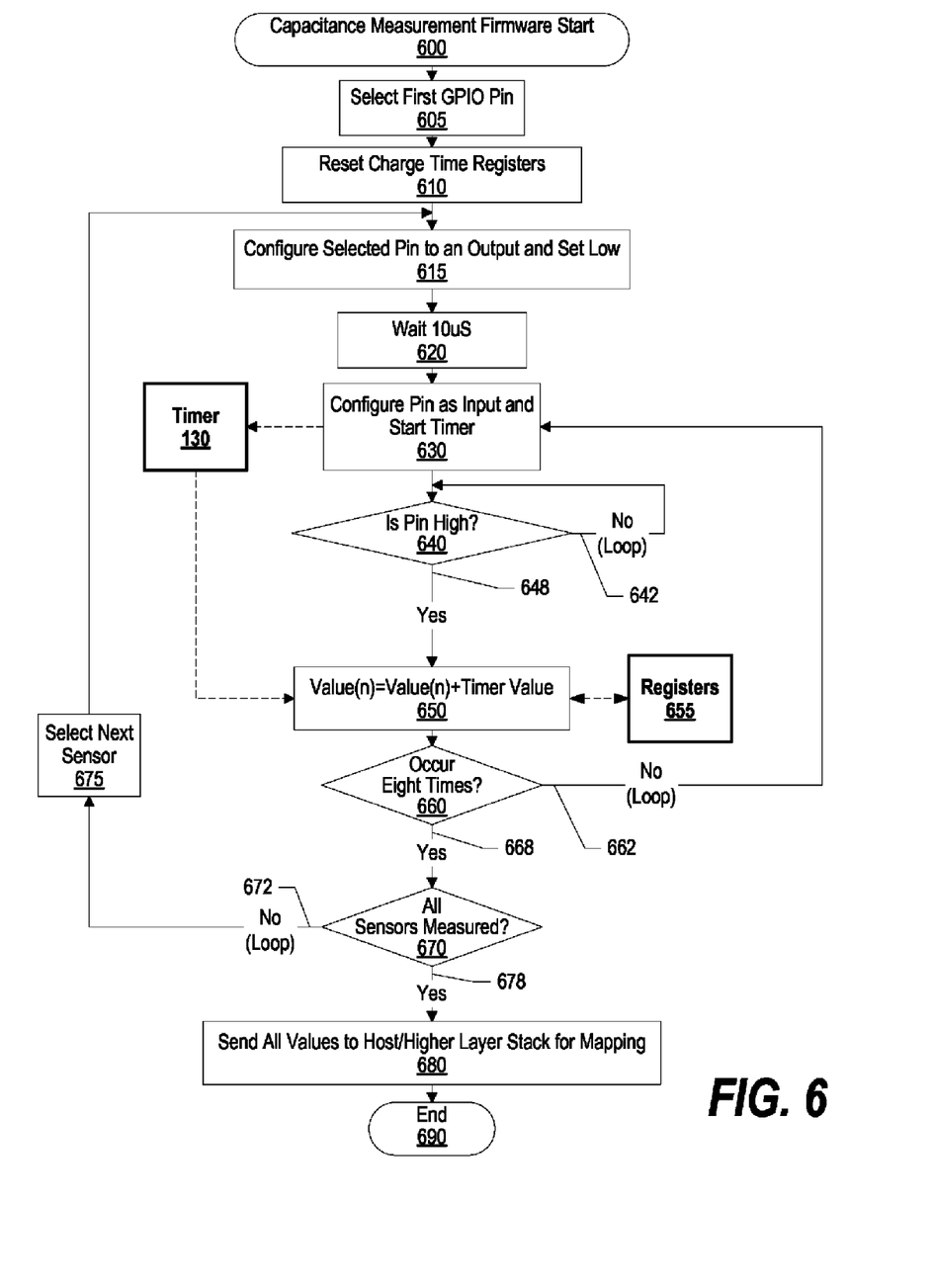
FIG. 6 is a flowchart showing steps taken in measuring microcontroller pin voltage charge times that depend upon corresponding sensor capacitances.

FIG. 6 is a flowchart showing steps taken in measuring microcontroller pin voltage charge times that depend upon corresponding sensor capacitances. A microcontroller, such as microcontroller 115 shown in FIG. 1, may include firmware (capacitance measurer 120) that monitors voltage levels on input pins and uses a hardware timer (timer 130) to determine an amount of time that the voltage level takes to cross a "high input" threshold voltage that microcontroller 115 identifies as a "1." (see FIG. 4 and corresponding text for further details). The embodiment shown in FIG. 1 includes pull-up resistors and the steps shown in FIG. 6 reflect such embodiment. As one skilled in the art can appreciate, pull down resistors may be used instead of pull-up resistors and, in this embodiment, a system would perform steps opposite of that shown in FIG. 6 (e.g., set input to high instead of low).

Processing commences at 600, whereupon processing selects a first GPIO pin. The embodiment shown in FIG. 1 includes fourteen sensors, each of which are connected to +V 180 through pull-up resistors 160. At step 610, processing resets charge time registers corresponding to the pins to zero. These registers are subsequently used to store charge times for each pin (discussed below).

Next, processing configures the selected pin as an output and sets to a low value, thus grounding the input and discharging capacitance build-up at the corresponding sensor (see FIG. 2 and corresponding text for further details). In order to ensure that the capacitance is fully discharged, processing waits one to ten microseconds (step 620) before configuring the pin as an input and starting timer 130 at step 630. When the pin is configured as an input, the pin appears as high impedance and, in turn, the pin's voltage level rises based upon an R/C time constant.

A determination is made as to whether the pin's voltage has crossed a high input voltage threshold (e.g., one-half of +V 180), thus indicating a "high" on the input pin (decision 640). If the pin is not considered high, decision 640 branches to "No" branch 642, which loops back to continue to monitor the input pin, all the while timer 130 is incrementing. This looping continues until the input pin is considered high, at which point decision 640 branches to "Yes" branch 648.

At step 650, processing adds timer 130's charge time value to the selected pin's corresponding charge time register value (registers 655). Since this a first measurement for the pin, the initial charge time register is zero and, therefore, timer 130's value is stored in the charge time register. In order to improve dynamic range and signal-to-noise properties (e.g., avoid detecting glitches), processing sequentially conducts multiple measurements of a sensor. The rate at which these measurements are conducted is many times faster (e.g., in microseconds) than a user moves a finger. Since processing takes eight successive measurements (discussed below), on the second pass, timer 130's second value is added to the value that was stored during the first pass. As one skilled in the art can appreciate, other values besides eight may be used to achieve similar results.

A determination is made as to whether the selected pin has proceeded through eight measurement cycles (decision 660). If the input pint has not proceeded through eight measurement cycles, decision 660 branches to "No" branch 662, which loops back to reset the pin and measure its voltage charge time. This looping continues until the input pin has proceeded through eight measurement cycles, at which point decision 660 branches to "Yes" branch 668. As discussed previously, processing proceeds through eight measurement cycles in order to improve dynamic range and signal-to-noise properties, and one skilled in the art can appreciate that other values besides eight may be used to achieve similar results.

A determination is made as to whether all the sensors have been measured (decision 670). If all of the sensors have not been measured, decision 670 branches to "No" branch 672, which loops back and selects the next GPIO (step 675), and proceeds to take successive voltage charge time measurements. This looping continues until all of the sensors are measured, at which point decision 670 branches to "Yes" branch 678.

At step 680, processing sends all the voltage charge times for each pin to a host processor or the microcontroller's higher layer stack firmware for mapping. Processing ends at 690.

Figure 7:
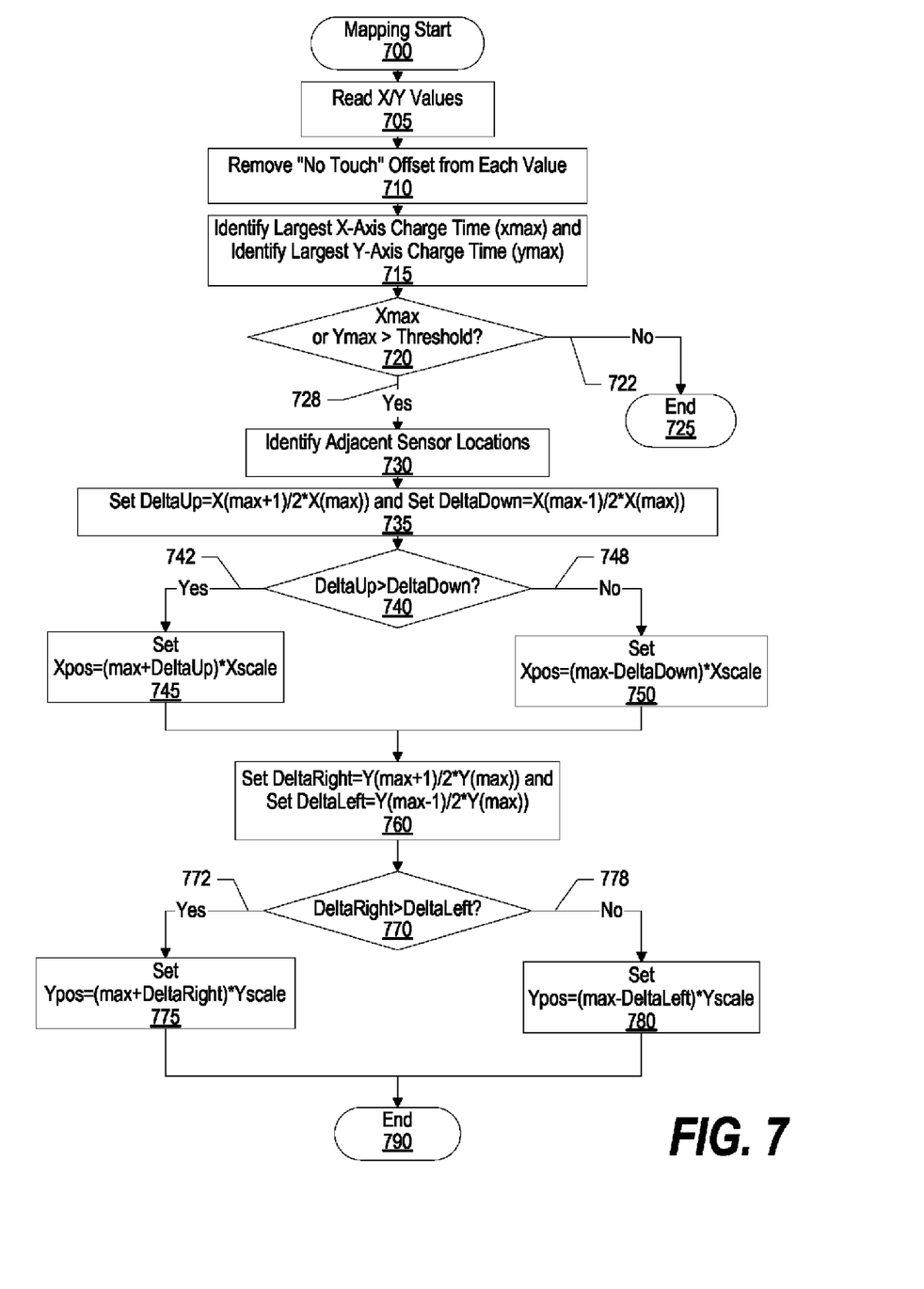
FIG. 7 is a flowchart showing steps taken in mapping x-axis charge times and y-axis charge times to a two-dimensional location.

FIG. 7 is a flowchart showing steps taken in mapping x-axis charge times and y-axis charge times to a two-dimensional location. A microcontroller cumulates charge times that correspond to x-axis sensors and y-axis sensors (see FIGS. 5, 6, and corresponding text for further details). In turn, the steps shown in FIG. 7 analyze the cumulated values and maps them to a two-dimensional contact location.

Processing commences at 700, whereupon processing reads the x-axis charge times and the y-axis charge times (step 705). At step 710, processing removes a no-touch offset from each of the charge times, which is a time at which a sensor takes to charge when its corresponding sensor is not touched (e.g., charge time based upon stray capacitance). The no-touch offset may be different for each sensor location and may be programmed into the firmware or measured and stored into a volatile or non-volatile memory as part of a software-defined calibration phase.

Next, processing identifies the maximum x-axis charge time (xmax) and the maximum y-axis charge time (ymax) from the x-axis and y-axis charge times read during step 705 (step 715). A determination is made as to whether the maximum x-axis charge time or the maximum y-axis charge time is greater than a threshold value in order to minimize false readings (decision 720). If either is not greater than the threshold value, the user is not touching any of the touchpad's sensors and decision 720 branches to "No" branch 722, which terminates the process at step 725. The threshold value may vary depending upon an amount of noise or drift that may occur, and may also dynamically vary depending upon environmental conditions, such as the presence of water or other high dielectric material that can alter a signal. As such, a higher threshold value requires a higher charge time to be detected.

On the other hand, if the maximum x-axis charge time and/or the maximum y-axis charge time is greater than the threshold, decision 720 branches to "Yes" branch 728. At step 730, processing identifies adjacent sensor locations corresponding to the maximum charge times. For example, if the maximum x-axis charge time sensor location is at a $4^{th}$ position, processing identifies sensors at the $3^{rd}$ and $5^{th}$ positions as adjacent x-axis sensor locations.

At step 735, processing computes adjacent charge time ratios that are a "delta up" value and a "delta down" value based upon the adjacent x-axis sensor locations' charge times. As can be seen, in order to convert charge times to ratios, delta-up is equal to the "upper" adjacent x-axis charge time (e.g., sensor location 5 charge time) divided by twice the maximum x-axis charge time and delta-down is equal to the "lower" adjacent x-axis charge time (e.g., sensor location 3 charge time) divided by twice the maximum x-axis charge time.

A determination is made as to which adjacent x-axis charge time ratio is larger in order to "fine-tune" the x-axis position, such as whether the x-axis position is above or below the maximum x-axis charge time sensor location (decision 740). If delta up is larger, decision 740 branches to "Yes" branch 742, whereupon processing sets an x-axis position equal to the maximum x-axis charge time sensor location (e.g., $4^{th}$ position) combined with the delta up ratio (e.g., 0.6) and multiplied by the resolution of the x-axis (e.g., 100 dpi) (step 745). On the other hand, if delta down is larger, decision 740 branches to "No" branch 748, whereupon processing sets an x-axis position equal to the maximum x-axis charge time sensor location (e.g., $4^{th}$ position) subtracted by the delta down ratio and multiplied by the resolution of the x-axis (step 750). As such, the computed x-axis position is the x-axis pixel location of where the user is touching the touchpad.

Likewise, at step 760, processing computes a "delta right" value and a "delta left" value based upon the adjacent y-axis sensor locations' charge times. Again, as can be seen, in order to convert charge times to ratios, delta-right is equal to the "right" adjacent y-axis charge time divided by twice the maximum y-axis charge time and delta-left is equal to the "left" adjacent y-axis charge time divided by twice the maximum y-axis charge time.

A determination is made as to which adjacent y-axis charge time ratio is larger in order to "fine-tune" the y-axis position, such as whether the y-axis position is to the right or to the left of the maximum y-axis charge time sensor location (decision 770). If delta right is larger, decision 770 branches to "Yes" branch 772, whereupon processing sets a y-axis position equal to the maximum y-axis charge time sensor location combined with the delta up ratio and multiplied by the resolution of the y-axis (e.g., 100 dpi) (step 775). As such, the computed y-axis position is the y-axis pixel location where the user is touching the touchpad. On the other hand, if delta left is larger, decision 770 branches to "No" branch 778, whereupon processing sets a y-axis position equal to the maximum y-axis charge time sensor location subtracted by the delta left ratio and multiplied by the resolution of the y-axis (step 780). By using the x-axis position and the y-axis position, a contact location may be determined that identifies the location that the user is touching the touchpad. Processing ends at 790.

Figure 8:
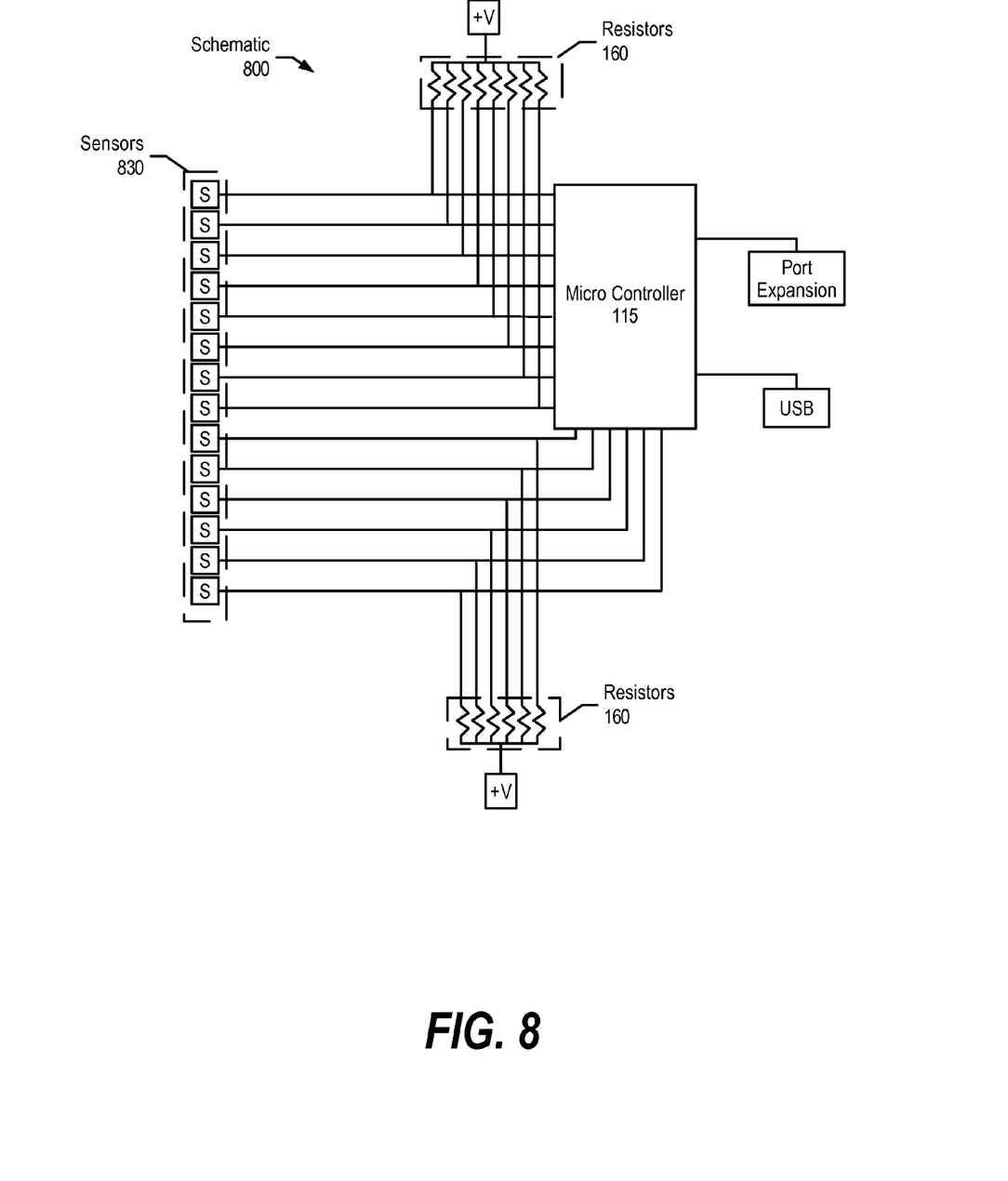
FIG. 8 is a schematic according to one embodiment of the present invention.

FIG. 8 is a schematic according to one embodiment of the present invention. Schematic 800 includes microcontroller 115, which couples to sensors 830. Each of sensors 830 couples to one of pull-up resistors 160. A portion of sensors 830 correspond to x-axis sensor locations and a portion of sensor 830 correspond to y-axis sensor locations. As discussed previously, resistors 160 may be configured to be pull-down resistors and, in this embodiment, microcontroller 115 performs steps opposite to that shown in FIG. 6 to capture charge times.

Figure 9:
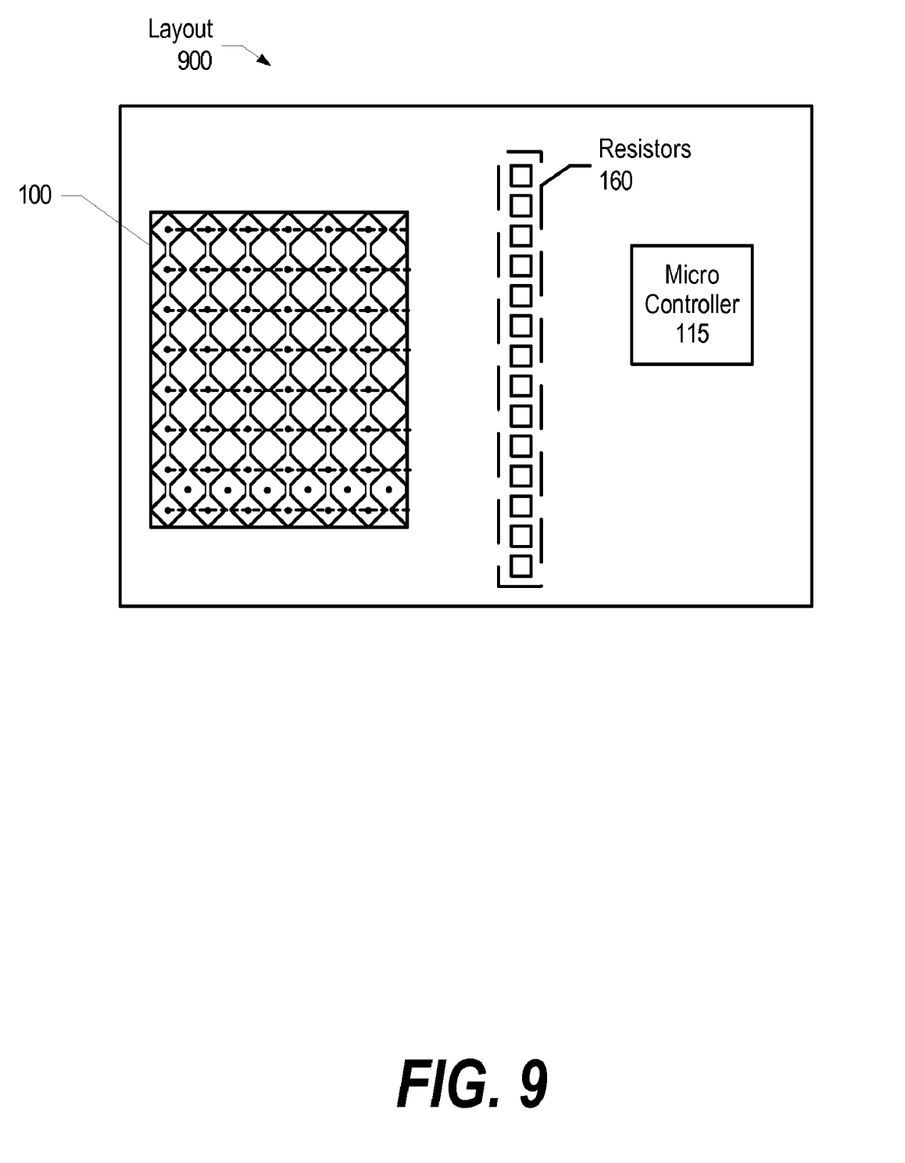
FIG. 9 is a board layout according to one embodiment of the present invention.

FIG. 9 is a board layout according to one embodiment of the present invention. Layout 900 corresponds to schematic 800 shown in FIG. 8. Touchpad 100 includes multiple sensors that are configured in an 8 by 6 matrix. In one embodiment, as discussed earlier, touchpad 100 includes electrodes that are constructed of copper material on a printed circuit board. In this embodiment, touch pad 100 may be covered by a thin insulating material, such as vellum or thin Plexiglas. In turn, each electrode forms a sensor that, when a voltage is applied, inherently creates a capacitive charge. The embodiment shown in FIG. 9 shows that touch pad 100 includes an 8×6 matrix of diamond shaped sensors. As one skilled in the art can appreciate, other patterns and sizes may be used to implement touchpad 100.

Figure 10:
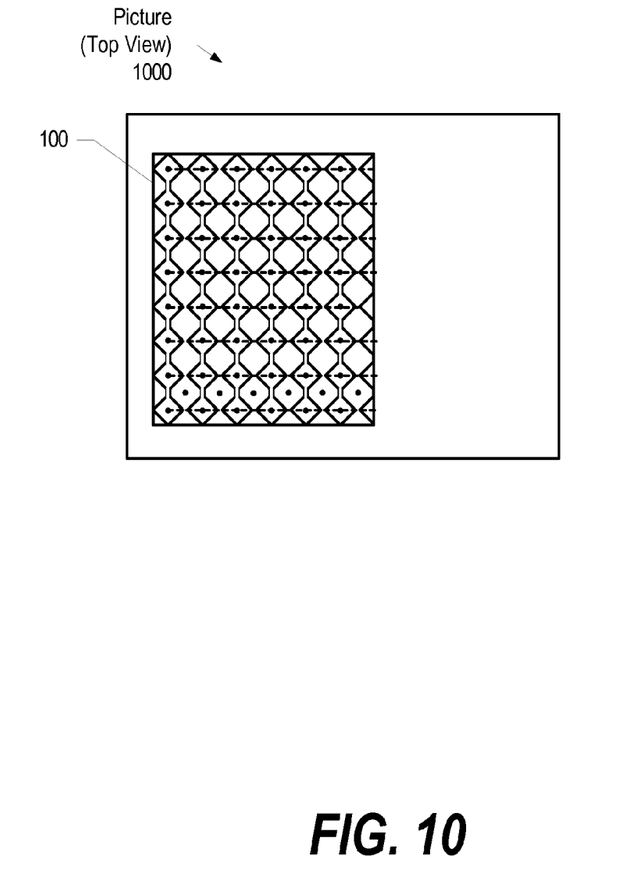
FIG. 10 is picture showing a top view of a printed circuit board according to one embodiment of the invention.

FIG. 10 is picture showing a top view of a printed circuit board according to one embodiment of the present invention. Picture 1000 shows touchpad 100, which includes sensors that are configured in a diamond pattern.

Figure 11:
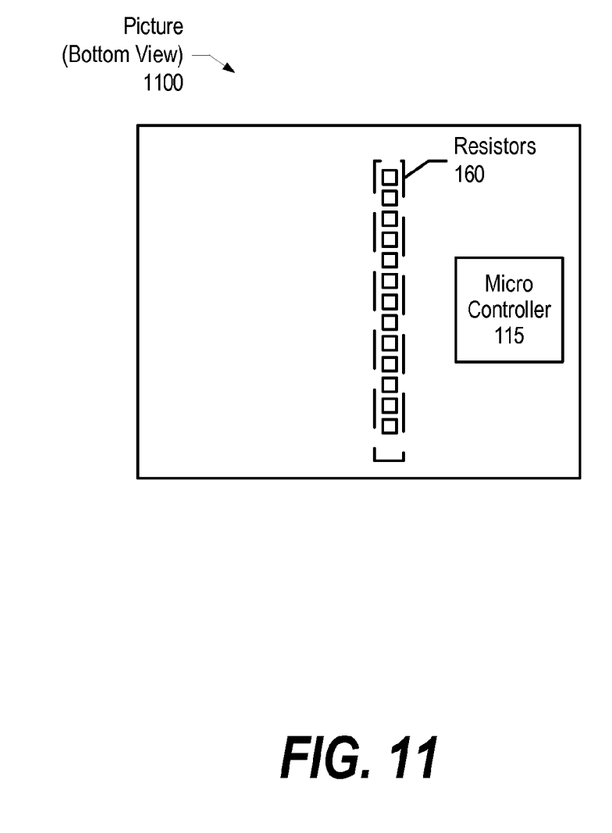
FIG. 11 is picture showing a bottom view of a printed circuit board according to one embodiment of the invention.

FIG. 11 is picture showing a bottom view of a printed circuit board according to one embodiment of the present invention. Picture 1100 shows microcontroller 115 and resistors 160 at locations on a circuit board. As one skilled in the art can appreciate, microcontroller 115 and resistors 160 may be located on other areas of the circuit board than what is shown in FIG. 11.

Figure 12:
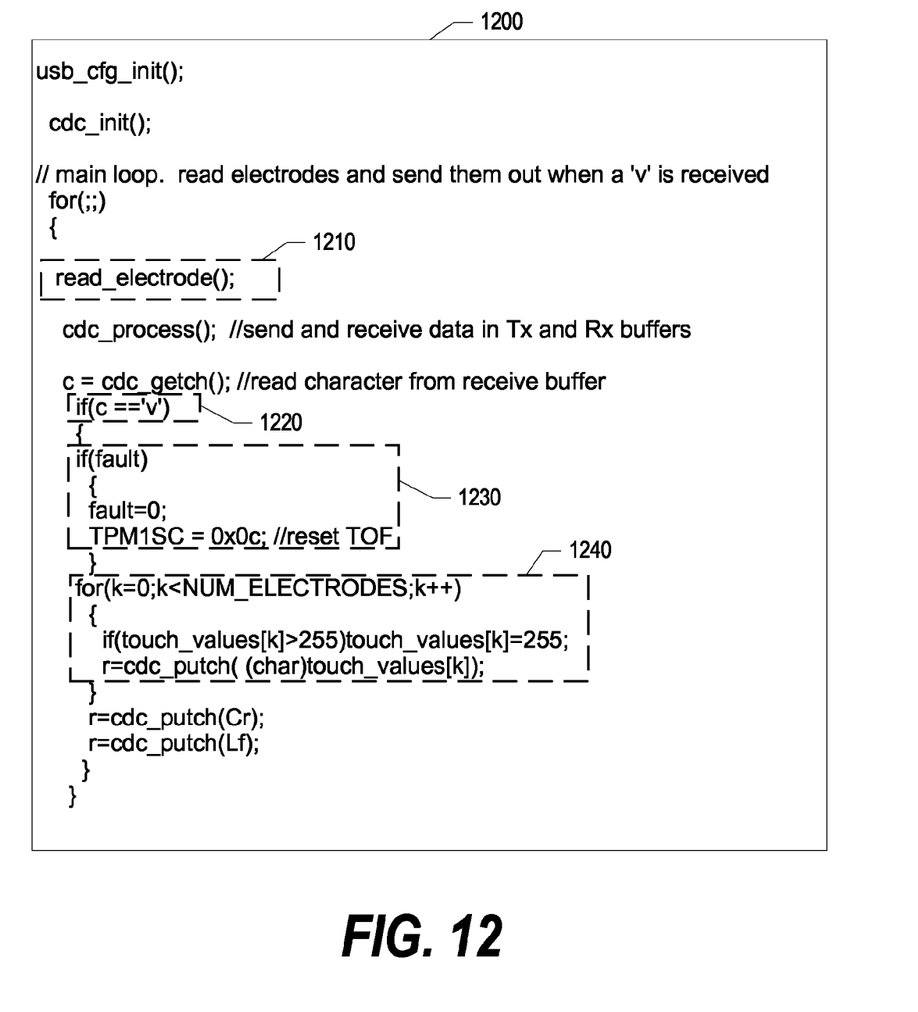
FIG. 12 is exemplary firmware code according to one embodiment of the invention.

FIG. 12 is exemplary firmware code according to one embodiment of the present invention. Code 1200 runs in a continuous loop and monitors sensor values and tracks when capacitance values for particular sensors changes when a user touches sensors that couple to the sensors. Each time through its loop, function read_electrode( ) 1210 reads all eight x-axis and all six y-axis electrode values and stores them into memory, such as static random access memory (SRAM). In one embodiment, each value may be 16-bits in length, represented by two bytes.

In one embodiment, code 1200 uses a universal serial bus (USB) connection for communication between a microcontroller and host processor (e.g., a CDC class USB bus). Conditional statement 1220 waits to receive a character from the host computer, in this case, a lower-case "v". If a lower-case "v" is not received, firmware 1200 continues in the loop. If a "v" is detected, code 1200 may check for a fault condition that may be used to inform other processes to take corrective action (code segment 1230). In this embodiment, code segment 1230 currently ignores faults.

Code segment 1240 first checks to see if the electrode value is larger than a threshold "255." If so, code segment sets the electrode value to 255 in order to ensure that the final electrode value may be represented by a single byte. Finally, the value is sent to a host computer. In one embodiment, converting the value from a two-byte value to a single value is optional. Finally, code 1200 sends an ASCII carriage return and a line-feed value to mark the end of the transmitted data.

One of the preferred implementations of the invention is a client application, namely, a set of instructions (program code) or other functional descriptive material in a code module that may, for example, be resident in the random access memory of the computer. Until required by the computer, the set of instructions may be stored in another computer memory, for example, in a hard disk drive, flash memory, or in a removable memory such as an optical disk (for eventual use in a CD ROM) or floppy disk (for eventual use in a floppy disk drive). Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps. Functional descriptive material is information that imparts functionality to a machine. Functional descriptive material includes, but is not limited to, computer programs, instructions, rules, facts, definitions of computable functions, objects, and data structures.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A machine-implemented method comprising:
   using a processing unit to identify a maximum x-axis charge time from a plurality of x-axis charge times, the maximum x-axis charge time corresponding to a maximum x-axis sensor location;
   identifying a first adjacent x-axis charge time and a second adjacent x-axis charge time, the first adjacent x-axis charge time corresponding to a first adjacent x-axis sensor location adjacent to the maximum x-axis sensor location and the second adjacent x-axis charge time corresponding to a second adjacent x-axis sensor location adjacent to the maximum x-axis sensor location;
   computing a first adjacent x-axis charge time ratio using the first adjacent x-axis charge time and computing a second adjacent x-axis charge time ratio using the second adjacent x-axis charge time;
   determining that the first adjacent x-axis charge time ratio is larger than the second adjacent x-axis charge time ratio;
   computing an x-axis position based upon the maximum x-axis charge time sensor location and the first adjacent x-axis charge time ratio;
   using the processing unit to identify a maximum y-axis charge time from a plurality of y-axis charge times, the maximum y-axis charge time corresponding to a maximum y-axis sensor location;
   identifying adjacent y-axis charge times, wherein the adjacent y-axis charge times correspond to adjacent y-axis sensor locations that are adjacent to the maximum y-axis sensor location;
   computing an adjacent y-axis charge time ratio based upon one of the adjacent y-axis charge times and computing a y-axis position based upon the maximum y-axis charge time sensor location and the adjacent y-axis charge time ratio; and
   mapping the x-axis position and the y-axis position to a contact location for a two-dimensional grid.

2. The method of claim 1 further comprising:
   removing a no-touch offset from each of the plurality of x-axis charge times and y-axis charge times; and
   after removing the no-touch offset from each of the plurality of x-axis charge times and y-axis charge times, determining whether any of the plurality of x-axis charge times or y-axis charge times exceeds a threshold value.

3. The method of claim 1 further comprising:
   selecting a general purpose input/output pin that connects to a sensor;
   configuring the general purpose input/output pin as an output and grounding the general purpose input/output pin;
   after grounding the general purpose input/output pin, configuring the general purpose input/output pin as an input;
   after configuring the general purpose input/output pin as the input, tracking an amount of time that the general purpose input/output pin takes to reach a high input voltage threshold; and
   storing the tracked amount of time as one of the x-axis charge times or y-axis charge times.

4. The method of claim 3 wherein a hardware timer is used to track the amount of time that the general purpose input/output pin takes to reach the high input voltage threshold.

5. The method of claim 3 further comprising:
   for eight consecutive occurrences, tracking the amount of time that the general purpose input/output pin takes to reach a high input voltage threshold, resulting in eight charge times; and
   combining the eight charge times, resulting in one of the x-axis charge times.

6. The method of claim 1 wherein a plurality of sensors are arranged in a matrix formation, wherein a subset of the plurality of sensors produce the x-axis charge times and a different subset of the plurality of sensors produce the y-axis charge times.

7. A system comprising:
   a touchpad that comprises a plurality of x-axis sensors and y-axis sensors;
   one or more processing units;
   a memory accessible by at least one of the processing units;
   a set of instructions stored in the memory and executed by at least one of the processing units in order to perform actions of:
      identifying a maximum x-axis charge time sensor location that corresponds to a maximum x-axis charge time from a plurality of x-axis charge times that correspond to the plurality of x-axis sensors;
      identifying a first adjacent x-axis charge time and a second adjacent x-axis charge time, the first adjacent x-axis charge time corresponding to a first adjacent x-axis sensor location adjacent to the maximum x-axis sensor location and the second adjacent x-axis charge time corresponding to a second adjacent x-axis sensor location adjacent to the maximum x-axis sensor location;
      computing a first adjacent x-axis charge time ratio using the first adjacent x-axis charge time and computing a second adjacent x-axis charge time ratio using the second adjacent x-axis charge time;
      determining that the first adjacent x-axis charge time ratio is larger than the second adjacent x-axis charge time ratio;
      computing an x-axis position based upon the maximum x-axis charge time sensor location and the first adjacent x-axis charge time ratio;
      identifying a maximum y-axis charge time sensor location that corresponds to a maximum y-axis charge time from a plurality of y-axis charge times that correspond to a plurality of y-axis sensor locations;
      identifying adjacent y-axis sensor locations and corresponding adjacent y-axis charge times, the adjacent y-axis sensor locations being adjacent to the maximum y-axis charge time sensor location;
      computing an adjacent y-axis charge time ratio based upon one of the adjacent y-axis charge times and computing a y-axis position based upon the maximum y-axis charge time sensor location and the adjacent y-axis charge time ratio; and
      mapping the x-axis position and the y-axis position to a contact location on a two-dimensional grid.

8. The system of claim 7 wherein at least one of the processing units is a microcontroller.

9. The system of claim 7 wherein the set of instructions further performs actions of:
   removing a no-touch offset from each of the plurality of x-axis charge times and y-axis charge times; and
   after removing the no-touch offset from each of the plurality of x-axis charge times and y-axis charge times, determining whether any of the plurality of x-axis charge times or y-axis charge times exceeds a threshold value.

10. The system of claim 7 wherein the set of instructions further performs actions of:
    selecting a general purpose input/output pin that connects to a sensor;

configuring the general purpose input/output pin as an output and grounding the general purpose input/output pin;

after grounding the general purpose input/output pin, configuring the general purpose input/output pin as an input;

after configuring the general purpose input/output pin as the input, tracking an amount of time that the general purpose input/output pin takes to reach a high input voltage threshold; and storing the tracked amount of time as one of the x-axis charge times or y-axis charge times.

11. The system of claim 10 wherein a hardware timer is used to track the amount of time that the general purpose input/output pin takes to reach the high input voltage threshold.

12. The system of claim 7 wherein the set of instructions further performs actions of:

for eight consecutive occurrences, tracking the amount of time that the general purpose input/output pin takes to reach a high input voltage threshold, resulting in eight charge times; and combining the eight charge times, resulting in one of the x-axis charge times.

13. A system comprising:

a touchpad that comprises a plurality of sensors; and a microcontroller that includes a plurality of general purpose pins coupled to the plurality of sensors, the microcontroller performing actions of:

identifying a maximum x-axis charge time sensor location that corresponds to a maximum x-axis charge time from a plurality of x-axis charge times that correspond to the plurality of sensors, each of the plurality of x-axis charge times associated with one of the plurality of general purpose pins;

identifying a first adjacent x-axis charge time and a second adjacent x-axis charge time, the first adjacent x-axis charge time corresponding to a first adjacent x-axis sensor location adjacent to the maximum x-axis sensor location and the second adjacent x-axis charge time corresponding to a second adjacent x-axis sensor location adjacent to the maximum x-axis sensor location;

computing a first adjacent x-axis charge time ratio using the first adjacent x-axis charge time and computing a second adjacent x-axis charge time ratio using the second adjacent x-axis charge time;

determining that the first adjacent x-axis charge time ratio is larger than the second adjacent x-axis charge time ratio;

computing an x-axis position based upon the maximum x-axis charge time sensor location and the first adjacent x-axis charge time ratio; and mapping the x-axis position to a contact location corresponding to the touchpad.

14. The system of claim 13 wherein the plurality of x-axis charge times correspond to a first subset of the plurality of sensors and a plurality of y-axis charge times correspond to a second subset of the plurality of sensors that included different sensors from the first subset of the plurality of sensors, the microcontroller further performing actions of:

identifying a maximum y-axis charge time sensor location that corresponds to a maximum y-axis charge time from the plurality of y-axis charge times, each of the plurality of y-axis charge times associated with one of the second subset of the plurality of general purpose pins;

identifying adjacent y-axis sensor locations and corresponding adjacent y-axis charge times, the adjacent y-axis sensor locations being adjacent to the maximum y-axis charge time sensor location;

computing an adjacent y-axis charge time ratio based upon one of the adjacent y-axis charge times and computing a y-axis position based upon the maximum y-axis charge time sensor location and the adjacent y-axis charge time ratio; and mapping the x-axis position and the y-axis position to a two-dimensional grid contact location.

15. The system of claim 13 wherein the microcontroller further performs actions of:

removing a no-touch offset from each of the plurality of x-axis charge times; and after removing the no-touch offset from each of the plurality of x-axis charge times, determining whether any of the plurality of x-axis charge times exceeds a threshold value.

16. The system of claim 13 wherein the microcontroller further performs actions of:

selecting one of the plurality of general purpose pins;

configuring the general purpose pin as an output and grounding the general purpose pin;

after grounding the general purpose pin, configuring the general purpose pin as an input;

after configuring the general purpose pin as the input, tracking an amount of time that the general purpose pin takes to reach a high input voltage threshold; and storing the tracked amount of time as one of the x-axis charge times.

17. The system of claim 16 wherein the microcontroller further comprises:

a hardware timer that tracks the amount of time that the general purpose pin takes to reach the high input voltage threshold.

* * * * *